United States Patent
Steinberger et al.

(10) Patent No.: US 6,367,346 B1
(45) Date of Patent: Apr. 9, 2002

(54) SHIFT FORK FOR AN AUTOMOTIVE GEARBOX

(75) Inventors: Wolfgang Steinberger, Herzogenaurach; Klaus Kramer, Baudenbach; Arnold Trissler, Herzogenaurach, all of (DE)

(73) Assignee: INA Walzlager Schaeffler oHG (DE)

(*) Notice: Subject to any disclaimer, the term of this patent is extended or adjusted under 35 U.S.C. 154(b) by 0 days.

(21) Appl. No.: 09/582,081
(22) PCT Filed: Nov. 20, 1998
(86) PCT No.: PCT/EP98/07464
  § 371 Date: Jun. 21, 2000
  § 102(e) Date: Jun. 21, 2000
(87) PCT Pub. No.: WO99/32811
  PCT Pub. Date: Jul. 1, 1999

(30) Foreign Application Priority Data

Dec. 22, 1997 (DE) ......................................... 197 57 184

(51) Int. Cl.⁷ .............................................. F16H 63/32
(52) U.S. Cl. ..................... 74/473.37; 29/415; 192/82 R
(58) Field of Search ..................... 74/473.37; 29/415; 192/82 R

(56) References Cited

U.S. PATENT DOCUMENTS

| | | | |
|---|---|---|---|
| 1,585,935 A | 5/1926 | Muncy | |
| 3,587,783 A | * 6/1971 | Walters et al. | 184/11.1 |
| 4,238,012 A | * 12/1980 | Takiguchi et al. | 192/48.91 |
| 5,956,997 A | * 9/1999 | Oetjen et al. | 74/89.15 |
| 6,038,938 A | * 3/2000 | Szczepanski et al. | 74/473.24 |

FOREIGN PATENT DOCUMENTS

| | | |
|---|---|---|
| DE | 4316140 | 11/1994 |
| DE | 19601623 | 7/1997 |
| EP | 57166621 | 10/1982 |
| EP | 58195222 | 11/1983 |
| EP | 59027736 | 2/1984 |
| GB | 9578895 | 5/1964 |
| JP | 56-133457 | * 10/1981 |

* cited by examiner

*Primary Examiner*—Allan D. Herrmann
(74) *Attorney, Agent, or Firm*—Bierman, Muserlian and Lucas

(57) ABSTRACT

A gearshift fork (2, 3) for a manual transmission of an automotive vehicle is fixed on a selector rod and engages with its bifurcated section into a peripheral groove of a sliding sleeve. The bifurcated section (6) extends transversely of the central longitudinal axis of the selector rod and comprises a stiffening. To create an economic configuration of the gearshift fork (2, 3) and enable a production in large series, the gearshift fork is manufactured as a complete component by shaping without chip removal.

2 Claims, 2 Drawing Sheets

SHIFT FORK FOR AN AUTOMOTIVE GEARBOX

FIELD OF THE INVENTION

Gearshift forks are used in manual transmissions of automotive vehicles which are configured with a countershaft structure. Through these gearshift forks, the selector rods cooperate with sliding sleeves that couple idler pinions through coupling elements to the main shaft or to the countershaft. The invention therefore concerns a gearshift fork for a manual transmission of an automotive vehicle, which gearshift fork is connected to a selector rod and engages with its bifurcated section into a peripheral groove of a sliding sleeve, said bifurcated section extending transversely of the central longitudinal axis of the selector rod.

FIELD OF THE INVENTION

A gearshift fork of the pre-cited type is described in the textbook "Johannes Loomann Zahnradgetriebe, 1970 Edition, pages 96 to 98 and page 102". A distinction must be made between gearshift forks that are arranged rigidly on the selector rod and gearshift forks that are guided for pivoting in a so-called gearshift rocker. In both cases, the gearshift fork has a bifurcated projection that engages into a peripheral groove of the sliding sleeve, and a collar which serves to stiffen the entire gearshift fork and through which the gearshift fork is fixed on the selector rod or in the gearshift rocker. According to the state of the art, gearshift forks are made as die-cast parts out of aluminium. This method of fabrication is relatively uneconomical for large-series production which is required in the field of transmissions of automotive vehicles.

SUMMARY OF THE INVENTION

The object of the present invention is therefore to provide a gearshift fork that is suitable for manufacturing in large series and can be produced reliably using simple means.

The invention achieves this object by the fact that the gearshift fork comprising a stiffening in the form of an angled collar is made as a complete component by shaping without chip removal. In this way, it is possible to produce a gearshift fork which possesses a high degree of stiffness and is not subject to the risk of fracture despite its small overall dimensions and high bending loads. Due to the chipless shaping method, the gearshift fork can be manufactured very economically.

A further feature of the invention concerns a method of manufacturing the aforesaid gearshift fork, according to which method, the gearshift fork is made by deep drawing. Deep drawing is an extremely simple and reliable method and suitable for manufacturing components subjected to high loading. According to the invention, two gearshift forks are manufactured by deep drawing in one work step and are initially in the form of a pot-shaped component. The two gearshift forks are formed in the pot-shaped component as mirror images of each other. The bifurcated sections of the two gearshift forks which are connected to each other have then only to be separated from each other.

A particularly suitable embodiment of a gearshift fork to be manufactured as a deep drawn part is a gearshift fork whose collar extends at a right angle to the bifurcated section on one side. The gearshift fork can be fixed on the selector rod by welding.

BRIEF DESCRIPTION OF THE DRAWINGS

For a further explanation of the invention, reference is made to the drawings in which one example of embodiment of the invention is shown in simplified illustrations.

DETAILED DESCRIPTION OF THE DRAWINGS

Figure 1:
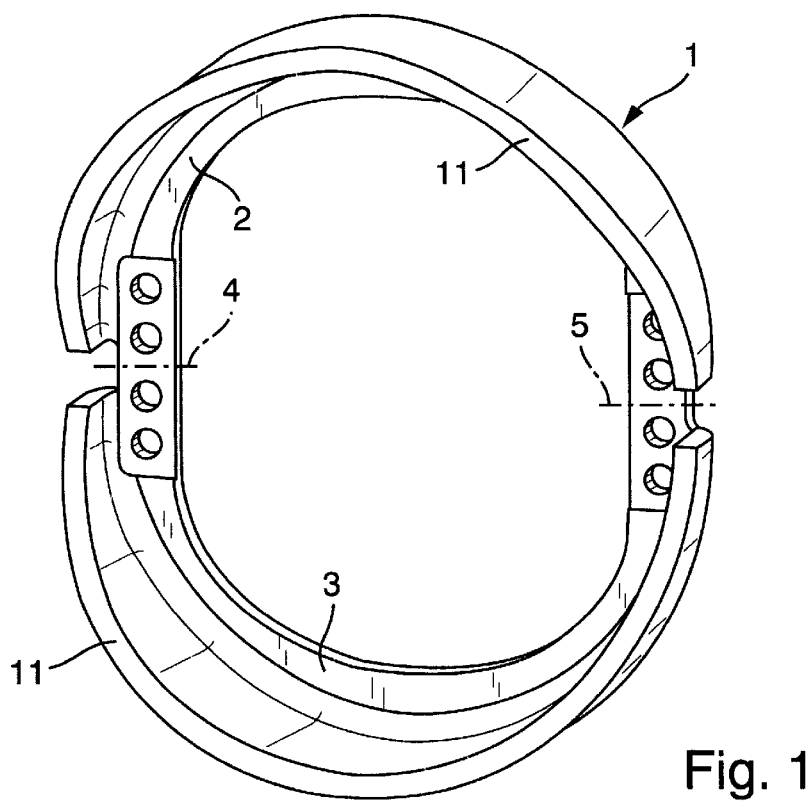
FIG. 1 shows a unit comprising two gearshift forks made by a deep drawing process.

FIG. 1 shows a component 1 made by shaping without chip removal and comprising two gearshift forks 2 and 3 connected to each other. These gearshift forks 2 and 3 are then separated from each other by cutting along the cutting lines 4 and 5. In this way, the gearshift fork 2, which is shown in FIG. 2 and will be described more closely in the following, is obtained.

Figure 2:
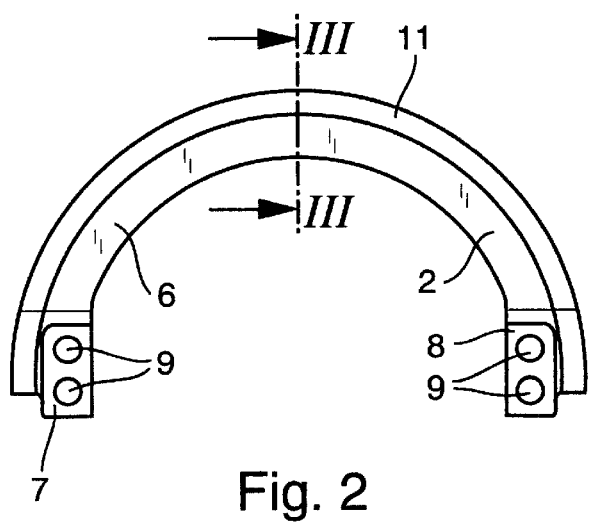
FIG. 2 shows a gearshift fork obtained after the separation of the structural unit shown in FIG. 1.
Figure 3:
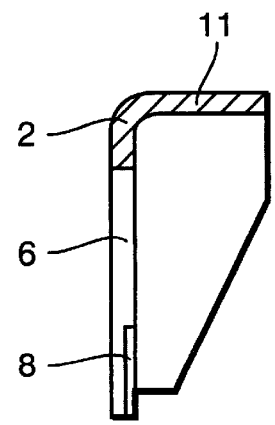
FIG. 3 shows a cross-section through the gearshift fork of FIG. 2 taken along line III—III.

From FIGS. 2 and 3 it is clear that this gearshift fork 2 comprises a bifurcated section 6 which comprises fixing surfaces 7 and 8 in its end regions in which sliding blocks, not shown, are fixed in bores 9. With these sliding blocks, not shown, the gearshift fork engages a peripheral groove 10a, schematically represented in FIG. 5, of a sliding sleeve 10. A collar 11 which serves to stiffen the entire gearshift fork 2, projects from the bifurcated section 6 of the gearshift fork 2.

Figure 4:
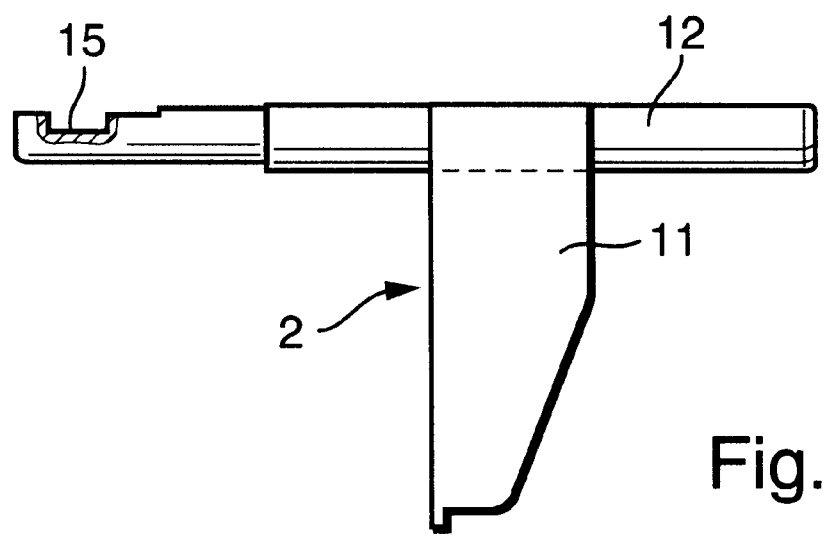
FIG. 4 is a scaled-down representation of a unit comprising a gearshift fork and a selector rod.
Figure 5:
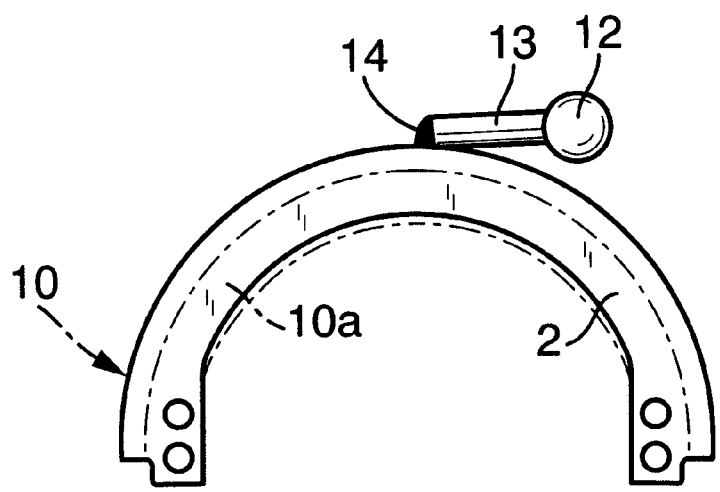
FIG. 5 shows a front view of the unit represented in FIG. 4.

As can be seen in FIGS. 4 and 5, the gearshift fork 2 is fixed on a selector rod 12. A strut 13 projects from the selector rod 12 and is fixed on the gearshift fork by a weld seam 14. On one end, the selector rod 12 comprises a cross-groove into which a shift finger, not referenced, of a gearshift lever engages during a gearshift operation. FIGS. 1 to 5 make it clear that gearshift forks made according to the invention can be manufactured economically and reliably in large series.

| List of reference numerals | |
|---|---|
| 1 | Component |
| 2 | Gearshift fork |
| 3 | Gearshift fork |
| 4 | Cutting line |
| 5 | Cutting line |
| 6 | Bifurcated section |
| 7 | Fixing surface |
| 8 | Fixing surface |
| 9 | Sliding blocks |
| 10 | Sliding sleeve |
| 10a | Peripheral groove of 10 |
| 11 | Collar |
| 12 | Selector rod |
| 13 | Strut |
| 14 | Weld seam |
| 15 | Cross-groove |

What is claimed is:

1. A method of making a gearshift fork (2, 3) for a manual transmission of an automotive vehicle, which gearshift fork can be connected to a selector rod (12) and engages with its bifurcated section (6), which extends transversely of the central longitudinal axis of the selector rod (12), into a peripheral groove of a sliding sleeve (10), the gearshift fork (2, 3) comprising a stiffening in form of a collar (11) extending at a right angle, and said gearshift fork (2, 3) being made by shaping without chip removal, characterized in that in a first work step, two mirror-image gearshift forks (2, 3) are made, at first together, as a complete, pot-shaped component (1) by deep drawing and then, in a second work step, said gearshift forks are separated from each other in the region of the ends of their bifurcated sections (6).

2. A method according to claim 1, characterized in that the collar (11) is fixed directly or indirectly on the selector rod (12) by welding.

* * * * *